US011792247B2

(12) United States Patent
Newton

(10) Patent No.: US 11,792,247 B2
(45) Date of Patent: *Oct. 17, 2023

(54) RECORDING SYSTEM AND METHOD OF MULTILAYER AND SYNCHRONIZED COMMUNAL SOCIAL MEDIA CONTENT

(71) Applicant: Groopview, Inc, Philadelphia, PA (US)

(72) Inventor: Delmond Newton, Philadelphia, PA (US)

(73) Assignee: Groopview, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,491

(22) Filed: Jul. 25, 2022

(65) Prior Publication Data

US 2022/0360615 A1    Nov. 10, 2022

Related U.S. Application Data

(63) Continuation-in-part of application No. 16/872,704, filed on May 12, 2020, now Pat. No. 11,399,050.

(60) Provisional application No. 62/825,212, filed on Mar. 28, 2019.

(51) Int. Cl.
*H04L 65/611* (2022.01)
*G06Q 50/00* (2012.01)

(52) U.S. Cl.
CPC ............ *H04L 65/611* (2022.05); *G06Q 50/01* (2013.01)

(58) Field of Classification Search
CPC .................. G06F 16/489; G06F 21/10; G06F 2221/0713; G06Q 20/1235; G06Q 30/0277; G06Q 50/01; G06Q 2220/18; H04L 65/60; H04L 65/602; H04L 65/605; H04L 65/80; H04L 65/1073; H04L 65/4015; H04L 65/4053; H04L 65/4076; H04L 65/4084; H04L 67/325; H04L 67/1095; H04L 9/3226; H04L 9/3227; H04L 2463/101; H04N 21/242; H04N 21/26208; H04N 21/2743; H04N 21/4788; H04W 12/033
See application file for complete search history.

(56) References Cited

U.S. PATENT DOCUMENTS 11,032,329 B2 *   6/2021   Engel ...................... H04L 65/80
11,297,391 B2 *   4/2022   Dharmaji ........... H04N 21/4622

* cited by examiner

*Primary Examiner* — Kostas J Katsikis
(74) *Attorney, Agent, or Firm* — Neal Blibo LLC; Arlene Neal

(57) ABSTRACT

A communal media system includes a synchronization system to: receive multimedia content for delivery to multiple user devices, a video recorded on one of the user devices, and social media content generated by the user devices; separate the multimedia content, the video and the social media content into a set of prioritized layers; and adjust simultaneous deliveries of the multimedia content, the video and the social media content to the user devices, based timestamp receipts and the fragment identifier acknowledgements received from the user devices, The multimedia content is delivered to each user devices at the same time and the social media content is delivered to the user devices at the same time while the multimedia content is being viewed on the user devices. A recording system records a communal session including the multimedia content, the video, and the social media content.

19 Claims, 7 Drawing Sheets

RECORDING SYSTEM AND METHOD OF MULTILAYER AND SYNCHRONIZED COMMUNAL SOCIAL MEDIA CONTENT

CROSS REFERENCE TO RELATED APPLICATION

The present application is a continuation-in-part of U.S. Provisional application Ser. No. 16/872,704 titled "A Communal Social Media System and Method," filed May 12, 2020, which claims the benefit of U.S. Provisional Application Ser. No. 62/825,212 titled "Method For Viewing Online Content," filed Oct. 23, 2019, which claims the benefit of U.S. Provisional Application Ser. No. 62/749,298 titled "Method For Viewing Online Content," filed Oct. 23, 2018, all of which are incorporated by reference herein in their entirety.

BACKGROUND OF THE INVENTION

Connective features on internet browsers such as Google Chrome and social media platforms, such as Facebook, Twitter, and Instagram, have transformed how individuals connected through these platforms may simultaneously participate in an event, even when these individuals are physically located in different locations. For example, individuals in different locations that are connected via Facebook may view an event such as a concert, movie, or sports match, stream a video, play a video game, or attend an education session at the same time, while also being able to communicate, for example via text, with each other over the social media platform. Similarly, individuals in different locations may watch the same movie using, for example, a Chrome tele party extension, while also being able to communicate, for example via text, during the movie. However, interactions over these platforms are typically not fully synchronized due to the differences in the network configurations of the individuals participating in a social media session. For example, when multiple individuals are simultaneously viewing a video on a platform, there are likely to be different lag times on when the video is received on each user's device due to the differences in, for example, the bandwidth of each user's network.

Moreover, interactions over these platforms are typically fragmented, wherein some platforms may provide one or more of video streaming, video sharing, group video chat and group text as discrete features.

SUMMARY

In some implementations, a communal media system includes a content management system, a synchronization system and a recording system. The content management system may include a memory to store multimedia content. The synchronization system may retrieve the multimedia content for delivery to a plurality of user devices, receive video recorded on one of the plurality of user devices, and receive social media content generated by the plurality of user devices. The synchronization system may separate the multimedia content, the video, and the social media content into a set of prioritized layers and transmit the multimedia content, the video, and the social media content to the plurality of user devices. The synchronization system may continuously receive at least one of timestamp receipts and fragment identifier acknowledgements associated with receipt of the multimedia content, the video, and the social media content from the plurality of user devices; and adjust simultaneous deliveries of the multimedia content, the video, and the social media content to the plurality of user devices, based on at least one of the timestamp receipts and the fragment identifier acknowledgements received from each of the plurality of user devices, wherein the multimedia content and the social media content are delivered to each of the plurality of user devices at a same time. The recording system may record a communal session including the multimedia content, the video, and the social media content.

In some implementations, a method for delivering multimedia content during a communal media session may include registering a plurality of user devices to participate in the communal media session. During the communal media session, the method includes retrieving the multimedia content for delivery to the plurality of user devices, receiving video recorded on one of the plurality of user devices, and receiving social media content generated by the plurality of user devices. The method also includes separating the multimedia content, the video, and the social media content into a set of prioritized layers and transmitting the multimedia content, the video, and the social media content to the plurality of user devices. The method further includes continuously receiving at least one of timestamp receipts and fragment identifier acknowledgements associated with receipt of the multimedia content, the video, and the social media content from the plurality of user devices; and adjusting simultaneous deliveries of the multimedia content, the video, and the social media content to the plurality of user devices, based on at least one of the timestamp receipts and the fragment identifier acknowledgements received from each of the plurality of user devices, wherein the multimedia content and the social media content are delivered to each of the plurality of user devices at a same time. The method also includes recording a video of a communal session including the multimedia content, the video, and the social media content.

In some implementations, a non-transitory computer-readable medium may store one or more instructions for wireless communication. The one or more instructions, when executed by one or more processors of a device, may cause the one or more processors to: retrieve the multimedia content for delivery to a plurality of user devices, receive video recorded on one of the plurality of user devices, and receive social media content generated by the plurality of user devices; separate the multimedia content, the video, and the social media content into a set of prioritized layers and transmit the multimedia content, the video, and the social media content to the plurality of user devices; continuously receive at least one of timestamp receipts and fragment identifier acknowledgements associated with receipt of the multimedia content, the video, and the social media content from the plurality of user devices; and adjust simultaneous deliveries of the multimedia content, the video, and the social media content to the plurality of user devices, based on at least one of the timestamp receipts and the fragment identifier acknowledgements received from each of the plurality of user devices, wherein the multimedia content and the social media content are delivered to each of the plurality of user devices at a same time; and record a communal session including the multimedia content, the video, and the social media content

Figure 1:
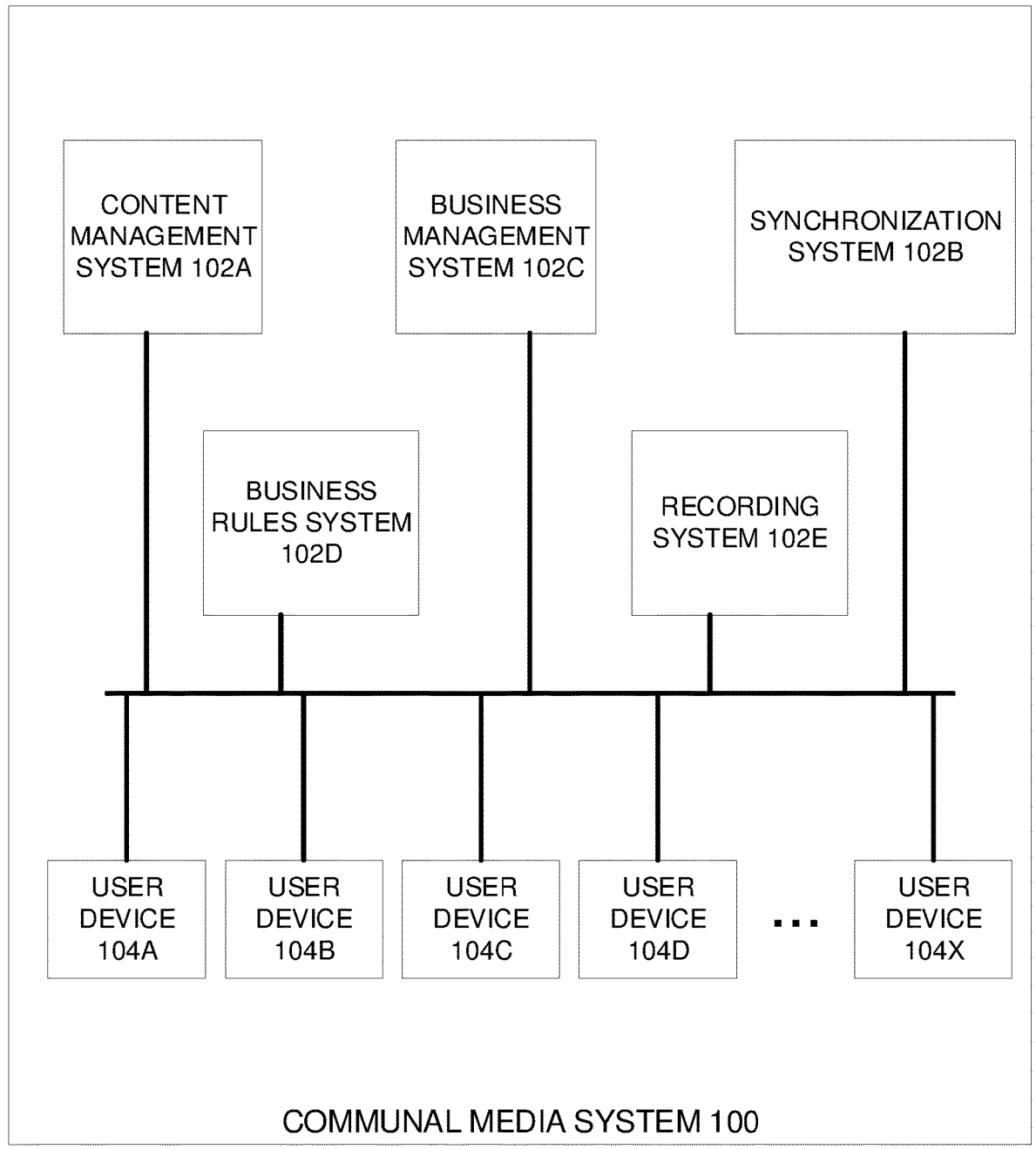
FIG. 1 is a block diagram of a communal media system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

FIG. 1 is a block diagram of a communal media system used in accordance with some embodiments. Communal media system 100 is configured to include one or more systems 102 (shown as, for example, a content management system 102a, a synchronization system 102b, a business management system 102c, a business rules system 102d, and a recording system 102e), each of which may be in the same physical location as components on a single computing device or on different computing devices that are communicatively coupled. Systems 102 may also be in remote locations on different computing devices that are communicatively coupled. Systems 102 may include additional components (not shown for the sake of simplicity) that may be used to transmit information across communal media system 100.

Content management system 102a may include multimedia content such as live or recorded videos. Synchronization system 102b is configured to synchronize delivery of information to communicatively coupled user devices such that the user devices in a communal session can receive the information at the same time. Business management system 102c is configured to perform, for example, user authorization and authentication, device registrations, entitlement checks, and/or optional digital rights management (DRM) content encryption for licensed content stored on content management system 102a. Business rules system 102d is configured to confirm access to and/or offer subscriptions for access to the multimedia content stored on content management system 102a. Recording system 102e is configured to record the communal session.

Communal media system 100 is also configured to include multiple user devices 104 (shown as, for example, user devices 104a-104x) that are communicatively coupled to each other and to systems 102. User devices 104 may be mobile devices including mobile phones or tablets, personal computers, gaming devices or other computing devices that can be used for viewing multimedia content and interacting over social media. Each user device 104 may be independently configured. For example, user device 104a may be configured to operate on the iOS platform and on a 5G network having a first set of specifications and user device 104b may be configured to operate on the Android platform on a 5G network having a second set of specifications, where the first and second specifications may be different. Despite the differences in the configurations of user devices 104, synchronization system 102b is configured to synchronize simultaneous delivery of multimedia and other social media content to user devices 104 such that each user device 104 receives the delivered content at the same time.

At an initial period, each user device 104a-104x is configured to download and install an application including communal media system 100 from, for example, a mobile app store or the Internet. After installing communal media system 100 on each user device 104, business management system 102c is configured to capture system configuration information from the user device and determine if the configuration on the user device meets a predetermined threshold. For example, business management system 102c may determine if the bandwidth available for each user device 104 is above a predetermined minimum bandwidth threshold. If business management system 102c determines that the bandwidth for a user device is below the predetermined minimum bandwidth threshold, business management system 102c may determine that the device with bandwidth below the minimum bandwidth threshold cannot be supported and will prevent the device from participating in future communal media sessions. If business management system 102c determines that the bandwidth of a user device 104 is at or above the predetermined threshold, business management system 102c may capture the user login credentials, such as user ID or social media login, from the user device to allow the user of that device to participate in future communal media sessions.

Consider, for example, that business management system 102c is configured evaluate the network configuration of each user device 104a-104x and determine the minimum network bandwidth required for simultaneous transmission over communal media system 100 to user devices 104-104x. If business management system 102c determines that user device 104a has a bandwidth of 100 Mbps, user device 104b has a bandwidth of 75 Mbps, user device 104c has a bandwidth of 100 Mbps, user device 104d has a bandwidth of 25 Mbps, and so on, with 25 Mbps being the slowest network bandwidth, business management system 102c may determine the minimum network bandwidth required for simultaneous transmissions to user devices 104-104x. If business management system 102c determines that the minimum required network bandwidth is below 25 Mbps, business management system 102c may capture the user login credentials from user devices 104-104x to allow the users of those devices to participate in future communal media sessions.

In some embodiments, business management system 102c is configured to capture system configuration information from a user device and determine if the configuration on the user device meets a predetermined threshold when the user device registers to participate in a specific session.

Consider an example where users of devices 104a-104d use those devices to register for a session on communal media system 100. Users of devices 104a-104d may register through a user interface on communal media system 100 and may browse media available on content management system 102a via the user interface. A user of one of devices 104a-104d (referred to herein as a host, i.e., the device used to initiate the session and/or used to select media content that is to be shared with the other devices in a session), for example, device 104a, may select a specific media. The media selected by device 104a may be shared/viewed on devices 104b-104d in a communal setting at an appointed time on communal media system 100. The user of device 104a may send invitations to devices 104b-104d for the users of devices 104a-104d to view the selected content at the appointed time. Each of the users of devices 104b-104d may accept or reject the invitation. At the appointed time, user devices 104a-104d may be connected via communal media system 100 for the communal viewing session of the content selected via device 104a.

In an embodiment, business management system 102c may obtain the configuration information from user devices 104a-104d when the user devices register to participate in a specific session. For example, business management system 102c may obtain the location, the network carrier, and/or the network type (for example, WiFi, LTE, 5G) of the carrier of each user device 104a-104d. Business management system 102c may also test the speed of each user device 104a-104d and store the information for each user device 104a-104d along with a timestamp.

If the selected information is licensed content, the user of each device 104a-104d may enter subscription information into the associated device 104a-104d, wherein each device may transmit the subscription information to business rules system 102d. Using the received subscription information, business rules system 102d may obtain confirmation for access to the licensed content from a content owner or distributor. When necessary, business rules system 102d may provide access to subscriptions to one or more user devices 104a-104d and is configured to receive payments for the subscription from one or more user devices 104a-104d. Once the confirmation from the content owner or distributor for the user each device 104a-104d is obtained, business management system 102c may obtain decryption keys for the content from a DRM system. Communal media system 100 may then present the decrypted information to user devices 104a-104d for communal viewing.

During the session, synchronization system 102b is configured to synchronize the simultaneous delivery of multimedia content, stored on content management system 102a, to user devices 104a-104d, such that each user device 104a-104d receives the delivered content at the same time with no noticeable delivery lag, as though each user is receiving the information on the same device. Synchronization system 102b is also configured to synchronize the simultaneous delivery of live videos captured from forward and/or rear cameras on one or more user device 104a-104d. The synchronized delivery is sent to those devices 104a-104d not creating the videos, such that each user device 104a-104d receives the delivered video at the same time it is being recorded with no noticeable delivery lag. Synchronization system 102b is further configured to simultaneously transmit video chats, texts, emotive responses, and other social media features generated on user devices 104a-104d while the users of those devices are viewing the delivered multimedia content.

In an embodiment, a user associated with a device 104a-104d may create a profile photo of the user, record an image of the user, or create an avatar that is configured to represent an image of the user, wherein the avatar may mimic the user's actions, including speaking and other actions performed by the user. The avatar or other images of users associated with devices 104a-104d, video chats, texts, emotive responses, and other social media features generated on devices 104a-104d may be overlaid on the delivered multimedia content. This enables the users of devices 104a-104d to view the multimedia content and social media interactions at the same time, without any noticeable lag time associated with receipt of the multimedia and social media content at user devices 104a-104d. Other content such as targeted advertisement and recommendations based on previous usage on one or more user device 104a-104d may also be overlaid on the delivered multimedia content.

In an embodiment, the host may pause, rewind, or fast forward the multimedia content, wherein synchronization system 102b is also configured to ensure that the pause, rewind, or fast forward action is synchronized across all user devices.

In an embodiment, the host may make the communal session live to the public by activating a live button on the user interface. Once the session is live, users of other devices, for example, devices 104e-104x that are accessing communal media system 100 may view and participate in the session by sending texts, emotive responses, and other social media features generated on those uses devices 104e-104x. The live session may have a ticker counter to identify how may users are participating in the live session.

In some embodiments, a thumbnail image of the selected content may be provided in communal media system 100. Users of devices 104a-104d may manipulate the thumbnail images by, for example, moving, resizing, or deleting the image on the user interface.

Figure 2:
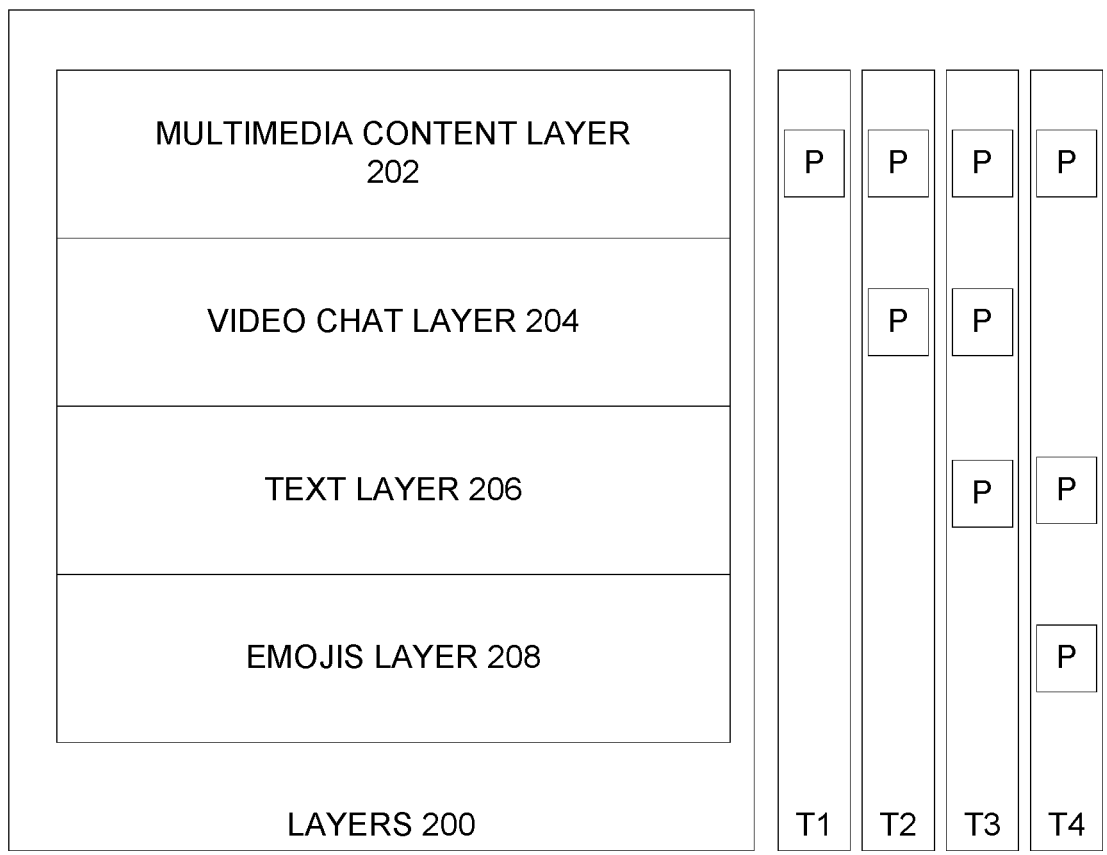
FIG. 2 is a block diagram of how packets are structured and delivered in the communal media system in accordance with some embodiments.

FIG. 2 is a block diagram of how packets are structured and delivered in the communal media system 100 in accordance with some embodiments. Synchronization system 102b is configured to separate content transmitted over communal media system 100 into multiple layers 200 and to synchronize delivery of the multiple layers to user devices 104a-104d, i.e., those user devices registered to participate in the session on communal media system 100. For example, synchronization system 102b may configure the multimedia content stored on content management system 102a in a multimedia content layer 202, video chats received from user devices 104a-104d in a video chat layer 204, texts received from user devices 104a-104d in a text layer 206, and emojis received from user devices 104a-104d in an emojis layer 204. It should be apparent that synchronization system 102b may separate content transmitted over communal media system 100 into more or fewer layers than layers 202-208.

After separating the content into layers 200, synchronization system 102b may prioritize delivery of packets. For example, packets in multimedia content layer 202 may have a first priority, packets in video chat layer 204 may have a second priority, packets in text layer 206 may have a third priority, and packets in emojis layer 204 may have a fourth priority. Synchronization system 102b is also configured to synchronize voice and video packets in video streams in multimedia content layer 202 and voice and video packets in video chat layer 204 so that there is no lag time between the voice and the video packets in each layer. As such, synchronization system 102b is configured to synchronize delivery of packets in the same layer and delivery of multiple layers of content across disparate devices and disparate access networks so that all user devices 104a-104d may receive content delivered over communal media system 100 at the same time.

Consider, for example, that synchronization system 102b has packets (P) in different layers that are to be delivered at times T1-T4, as shown in FIG. 2. At T1, the packets in multimedia content layer 202 are delivered first. At T2, the packets in multimedia content layer 202 are delivered before the packets in video chat layer 204. At T3, the packets in multimedia content layer 202 are delivered first, the packets in video chat layer 204 are delivered second, and the packets in text layer 206 are delivered last. At T4, the packets in multimedia content layer 202 are delivered first, the packets in text layer 206 are delivered second, and the packets in emoji layer 208 are delivered last.

Figure 3:
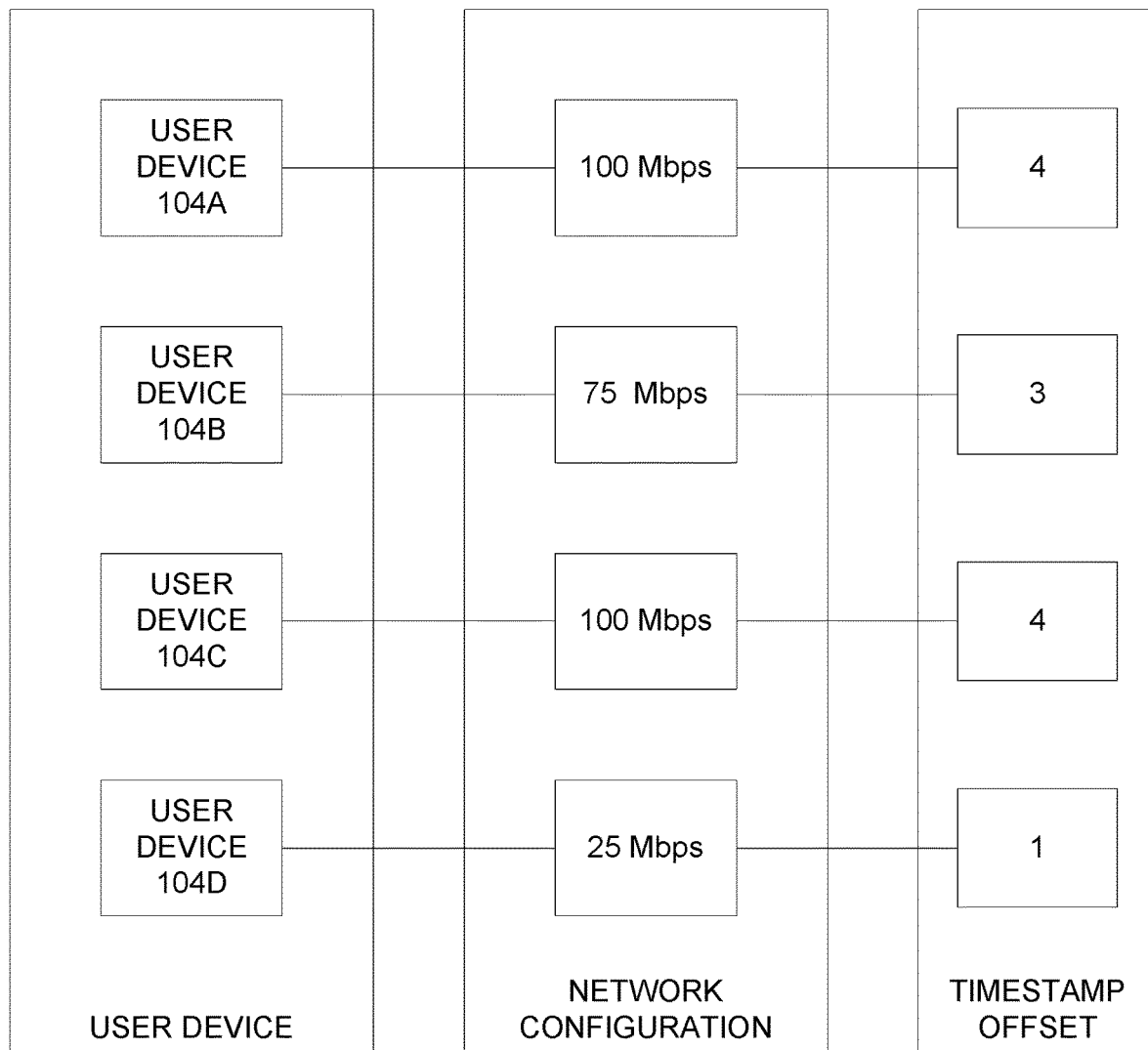
FIG. 3 is a block diagram of a timestamp structure used in accordance with some embodiments.

FIG. 3 is a block diagram of a timestamp structure used in accordance with some embodiments. When content is being transmitted over communal media system 100, at pre-determined time intervals during the session, synchronization system 102b is configured to continuously receive timestamp receipts from each user device 104a-104d. The timestamp receipts include timestamps of when a predefined number of packets is received by a user device. and timestamps of when a predefined number of packets is sent from the device. The interval for delivering and/or receiving timestamp receipts may be static or dynamic Static delivery may involve delivering and/or receiving timestamp receipts at predefined intervals (e.g., every 100 mms) and dynamic delivery may involve adapting delivery and/or receipt of timestamp receipts according to the various speeds of the heterogenous networks of user devices 104a-104d.

Synchronization system 102b may determine a timestamp offset for each user device 104a-104d and for each type/layer of content (video stream, video chat, text and emojis) delivered. In some embodiments, the timestamp offset may be based on a predetermined minimum network configuration and/or the timestamp receipts, wherein synchronization system 102b may adjust packet deliveries to correspond with the timestamp offset of each user device 104a-104d. Continuing with the example where user device 104a has a bandwidth of 100 Mbps, user device 104a has a bandwidth of 75 Mbps, user device 104a has a bandwidth of 100 Mbps, and user device 104a has a bandwidth of 25 Mbps, synchronization system 102b may set the timestamp offset for user devices 104a-104d based on the lowest bandwidth, as shown in FIG. 3. Accordingly, the timestamp offsets for user device 104a and 104c are set to four times the timestamp offset of user device 104d and the timestamp offset for user device 104b is set to three times the timestamp offset of user device 104d, This ensures that when packets are delivered using the timestamp offsets, synchronization system 102b can normalize the delivery of packets to all user devices 104a-104d (i.e., take care of propagation delays or speed up delivery based on the bandwidth). In this manner, all user devices 104a-104d will receive multimedia and social media contents at the same time and without any noticeable delay in receipt of the content among the devices, ensuring that users of devices 104a-104d are viewing and interacting with the content as if they were in the same physical location and viewing the content on the same device.

In addition to sending and receiving timestamp receipts to and from devices 104a-104d, synchronization system 102b may also send and/or receive information associated with frame and/or fragment of the multimedia content to devices 104a-104d. Continuing with the example above, before the viewing session begins, host user device 104a may request, from content management system 102a, a location of a manifest file including multimedia content for a viewing session. Content management system 102a may provide information including, for example, a Uniform Resource Locator (URL) and/or the name of the manifest file. Media fragments of, for example, three to six seconds of the multimedia content, may be stored in the manifest file. Based on resolution, each second of the media fragment may include, for example, twenty-four-sixty frames of full motion video and each frame may include a unique frame identifier. Before the communal session, host device 104a may send the URL for the manifest file to user devices 104b-104d participating in the communal session.

In addition to and/or in lieu of timestamp receipts transmitted to and from devices 104a-104d, synchronization system 102b may use the frame identifiers in the media fragments transmitted to and from devices 104a-104d to synchronize delivery of the media to devices 104a-104d. Consider, for example, that during the viewing session synchronization system 102b is to transmit a fragment with twenty-four frames, with each successive frame assigned an identifier from 1-24. Also consider that at time T1, synchronization system 102b is to transmit frames 1-10 to devices 104a-104d, and at time T2, synchronization system 102b is to transmit frames 11-20 to devices 104a-104d. Between T1 and T2 synchronization system 102b may receive frame identifier acknowledgements of the receipts of frames 1-10 from devices 104a-104d. If synchronization system 102b receives a frame identifier acknowledgements of the receipt of frames 1-10 from devices 104a-104b, and a frame identifier acknowledgement of the receipt of frames 1-7 from device 104c, and a frame identifier acknowledgement of the receipt of frames 1-8 from devices 104d, at T2, rather than send frames 8-10 to device 104c and frames 9 and 10 to device 104d, synchronization system 102b may transmit frames 11-20 to devices 104a-104d, thereby synchronizing delivery of the frames to devices 104a-104b with delivery of the frames to devices 104c-104d.

If the host device rewinds the media being played on the host device, the time offset associated with the host device and/or frame number associated with the content is adjusted continuously until the host device stops rewinding the media and playing the media resumes. Similarly, if the host device fast forwards the media being played on the host device, the time offset and/or frame number is adjusted continuously until the host device stops fast forwarding the media and playing the media resumes. The rewind or fast forward offset is sent to synchronization system 102b for adjustments of the transmissions on the other devices in the communal session. If the host device pauses the media being played on the host device, a message is sent to synchronization system 102b and transmissions of the media is paused, such that a pause action on the host device pauses playing of the media on all user devices at the same time.

In addition to performing configurations tests, including a speed test, on each user device 104a-104d to determine that the configuration of user device meets the minimum network threshold at the start of a session, business management system 102c may perform periodic speed tests (for example, on an as needed basis or at predefined intervals) on each user device 104a-104d and may send the results to synchronization system 102b.

At the start of the communal session, host device 104a may start to play the media fragments stored in the manifest file in an order determined, for example, by information obtained from the manifest file. At the start of the communal session, host device 104a may record a timestamp receipt for the start time, for example, in milliseconds or seconds, and may send the timestamp receipt and/or the frame number of the media fragment being played to synchronization system 102b. As the media is played, host device 104a may continuously send timestamp receipts and/or frame identifier acknowledgments of media fragment being played to synchronization system 102b. Synchronization system 102b may record the frame identifier acknowledgments, timestamp receipts, and/or the timestamp offset of host device 104a.

In addition to or instead of playing media fragments stored in the manifest file, host device may transmit video recorded on one or more cameras on host device 104a during the communal session. User devices 104b-104d may receive the start time for playing the media from synchronization system 102b. When user devices 104b-104d join the communal session, recording system 102d may trigger a camera function on host device 104a, if host device triggers a recording function to begin at the start of the communal session. For example, recording system 102d may trigger a dual camera function or a single camera function on host device 104a if host device 104a is sharing content from one or more its cameras. The recording function may be triggered at the beginning of or during the communal session. Whenever the recording function is triggered, recording system 102d may trigger the camera function on the device where video will be recorded. As such, the media sent from host device 104a may be media fragments stored in a manifest file and/or contents recorded by host device 104a. In some implementations, the media being viewed during the communal session, may also include contents being recorded by one or more cameras on any of devices 104a-104d in the communal session. One or more devices in the communal session may also begin recording the communal session by activating recording engine 102e via, for example, pressing a record button on a screen from communal media system 100 shown on the device.

Considering an example where the media being viewed during the communal session is media fragments stored in the manifest file and/or contents recorded by host device 104a, when the media playback starts, each user device 104b-104d may provide, to synchronization system 102b, a timestamp receipt of the start time of the media playback on the device and/or the frame identifier acknowledgment of the media fragment(s) received by the device.

During the communal session, each user device 104b-104d may also provide the progress of the media playback on a predetermined basis, for example, as defined by business management system 102c, to synchronization system 102b. Synchronization system 102b may review and compare the locations in the media being played on user devices 104a-104d on a pre-determined basis. Synchronization system 102b may continuously determine that the media being played on user devices 104a-104d are synchronized within a pre-determined period, for example, a pre-determined number of milliseconds or seconds. Synchronization system 102b may dynamically adjust the pre-determined period to ensure the quality of the multimedia content. The pre-determined period may be defined by business management system 102c. Synchronization system 102b may also ensure that the media being played on user devices 104b-104d is not ahead of the media being played on host device 104a.

During the communal session, each user devices 104a-104d may continuously send its timestamp receipts and/or the frame identifier acknowledgments for fragment(s) played on the device to synchronization system 102b. If the media being played on any of user devices 104a-104d falls behind a certain threshold, synchronization system 102b may provide signaling messages to user devices 104a-104d. The signaling messages may be defined by business management system 102c. Synchronization system 102b may make necessary adjustments in transmitting the media to user devices 104a-104d, for example, either by marginally slowing the media being played to one or more devices or by accelerating the media being played to one or more devices, until all the devices are on the same frame. By making the necessary adjustments in transmitting the media to user devices 104a-104d, synchronization system 102b may ensure that the media is transmitted and played on all devices within acceptable tolerances.

When recording system 102e is activated, recording system 102e may capture forward camera video and/or reverse camera video from a user device 104a-104d from which recorded content is being shared in the communal session. Recording system 102e may also capture video, video chat, audio, and/or social media content being transmitted in the communal session. Recording system 102e may be activated on any device in the communal system. For example, recording system 102e may record a video of the communal session on user device 104b even though the video being recorded and transmitted during the communal session is captured using the camera(s) on user device 104a. As noted previously, synchronization system 102b may make necessary adjustments in transmitting the media, including the video recorded from one or more cameras on a device in the communal session, video from an external source, video chats occurring in the communal session, and/or audio and/or social media content generated in the communal sessions, to user devices 104a-104d to ensure that the media is transmitted and played on all devices within acceptable tolerances.

In some implementations, recording system 102e may record the fragments as they are received or sent by the device which activated the recording of the communal session. For example, if user device 104a is transmitting contents recorded on one or more its cameras to user devices 104b-104d and fragments of content recorded on user device 104a is transmitted separately from video chats occurring in the communal session, and/or audio and/or social media content generated in the communal sessions, recording system 102e may record the fragments of a video captured from the cameras as they are sent, the fragments from the video chat as they are received or sent, the fragments from the audio as they are received or sent, and the fragments from social media content as they are received or sent. It should be apparent that fragments of different media may be combined or separated before, during, or after transmission in the communal session and are within the scope of this disclosure.

If user device 104b activates recording system 102e, recording system 102e may capture fragments are they are sent from and/or received by user device 104b. Similarly, if user device 104a activates recording system 102e, recording system 102e may capture fragments are they are sent from and/or received by user device 104a. If the fragments for different media are separated prior to transmission in the communal session and/or prior to receipt by recording system 102e, after recording system 102e captures the fragments, recording system may recreate a video of the communal session by combining/stitching together the fragments for different media using, for example, timestamp receipts and/or the frame identifier acknowledgments for fragment(s) captured on the device where recording system 102e is activated.

The recreated video file may be stored on the device where it was recorded and/or uploaded to the cloud. The recreated video file may also be imported into a third-party video editing software for further manipulation including, for example, edits or adding special effects. The recreated video file may also be transcoded into multiple and/or varying bit rates/resolutions for distribution to various types of devices using varying network connection speeds. A manifest file and meta data associated with the recreated video may be created and stored in content management system 102a so that the recreated video can be shared in another communal session or viewed outside of a communal session.

Figure 4A:
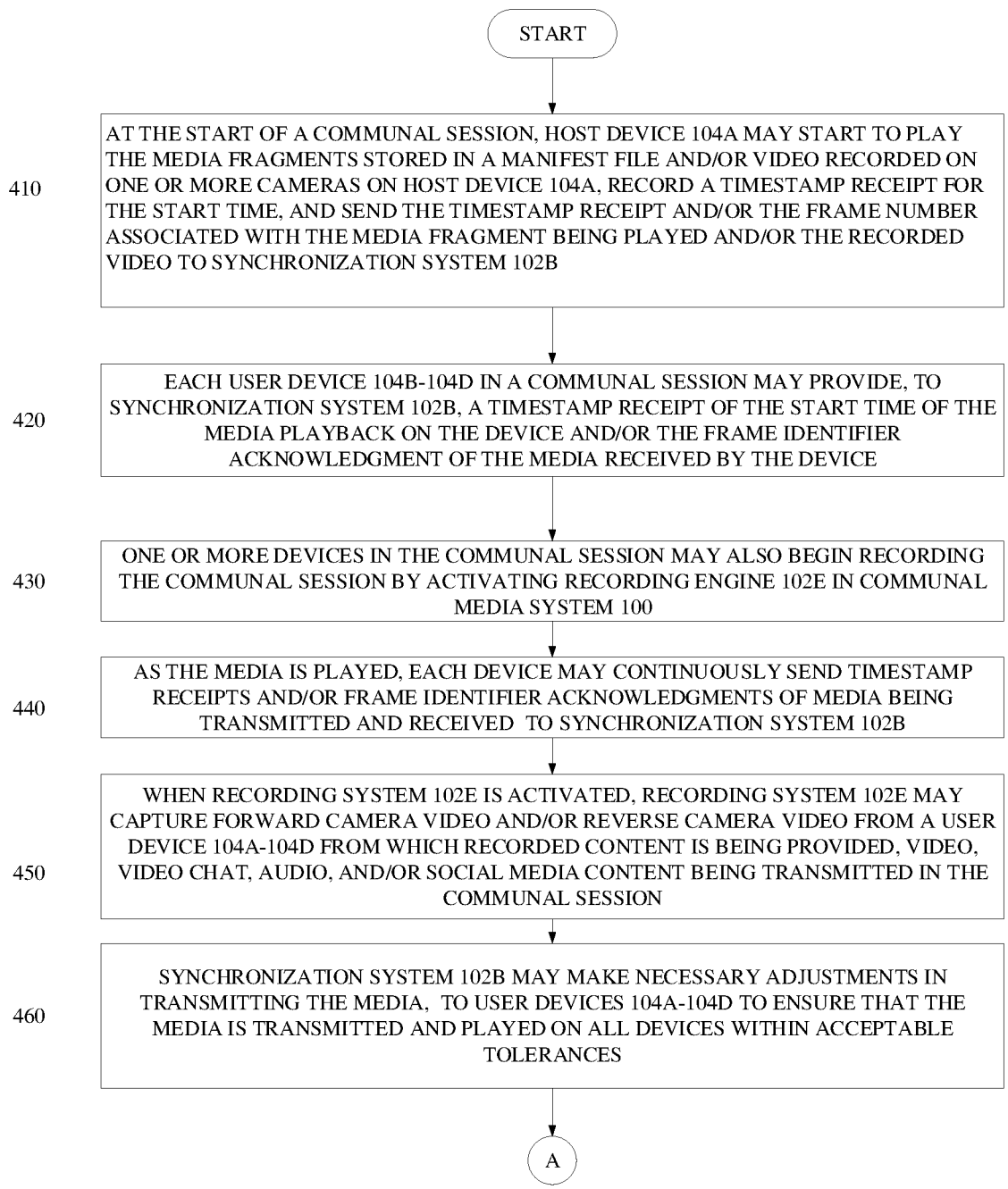
FIGS. 4A-4B is a flowchart of a method of recording a communal session in accordance with some embodiments.
Figure 4B:
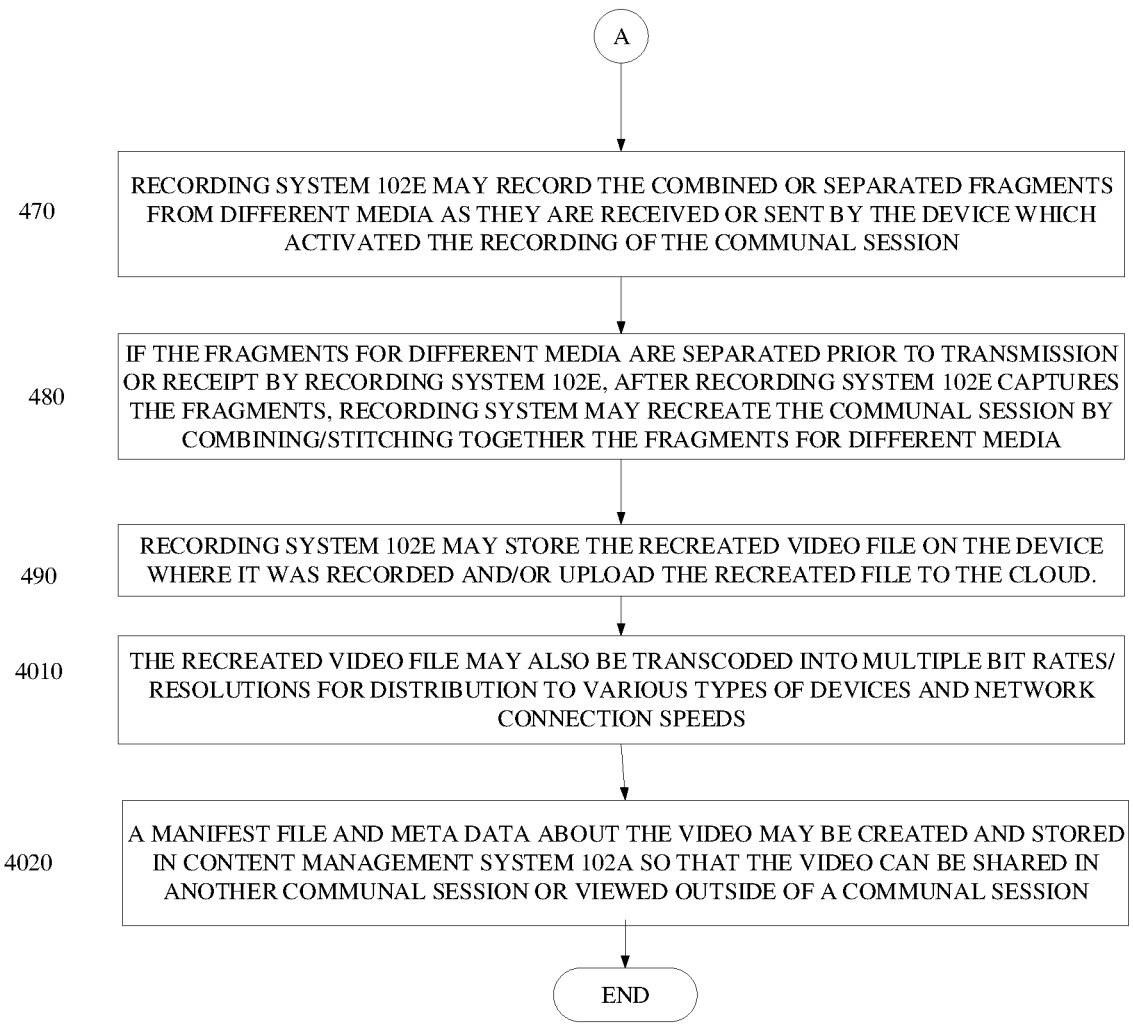

FIG. 4 is a flowchart of a method of recording a communal session. At 410, at the start of a communal session, host device 104a may start to play the media fragments stored in a manifest file and/or video recorded on one or more cameras on host device 104a, record a timestamp receipt for the start time, and send the timestamp receipt and/or the frame number associated with the media fragment being played and/or the recorded video to synchronization system 102b.

At 420, each user device 104b-104d in a communal session may provide, to synchronization system 102b, a timestamp receipt of the start time of the media playback on the device and/or the frame identifier acknowledgment of the media received by the device. At 430, one or more devices in the communal session may also begin recording the communal session by activating recording engine 102e in communal media system 100. At 440, as the media is played, each device may continuously send timestamp receipts and/or frame identifier acknowledgments of media being transmitted and received in the communal session to synchronization system 102b. At 450, when recording system 102e is activated, recording system 102e may capture forward camera video and/or reverse camera video from a user device 104a-104d from which recorded content is being provided, video, video chat, audio, and/or social media content being transmitted in the communal session. At 460, synchronization system 102b may make necessary adjustments in transmitting the media, including the video recorded from one or more cameras on a device in the communal session, video from an external source, video chats occurring in the communal session, and/or audio and/or social media content generated in the communal sessions, to user devices 104a-104d to ensure that the media is transmitted and played on all devices within acceptable tolerances.

At 470, recording system 102e may record the combined or separated fragments from different media as they are received or sent by the device which activated the recording of the communal session. At 480, if the fragments for different media are separated prior to transmission or receipt by recording system 102e, after recording system 102e captures the fragments, recording system may recreate the communal session by combining/stitching together the fragments for different media using, for example, timestamp receipts and/or the frame identifier acknowledgments for fragment(s) played on the device where recording system 102e is activated.

At 490, recording system 102e may store the recreated video file on the device where it was recorded and/or upload the recreated file to the cloud. At 4010, the recreated video file may also be transcoded into multiple bit rates/resolutions for distribution to various types of devices and network connection speeds. At 4020, a manifest file and meta data about the video may be created and stored in content management system 102a so that the video can be shared in another communal session or viewed outside of a communal session.

Figure 5:
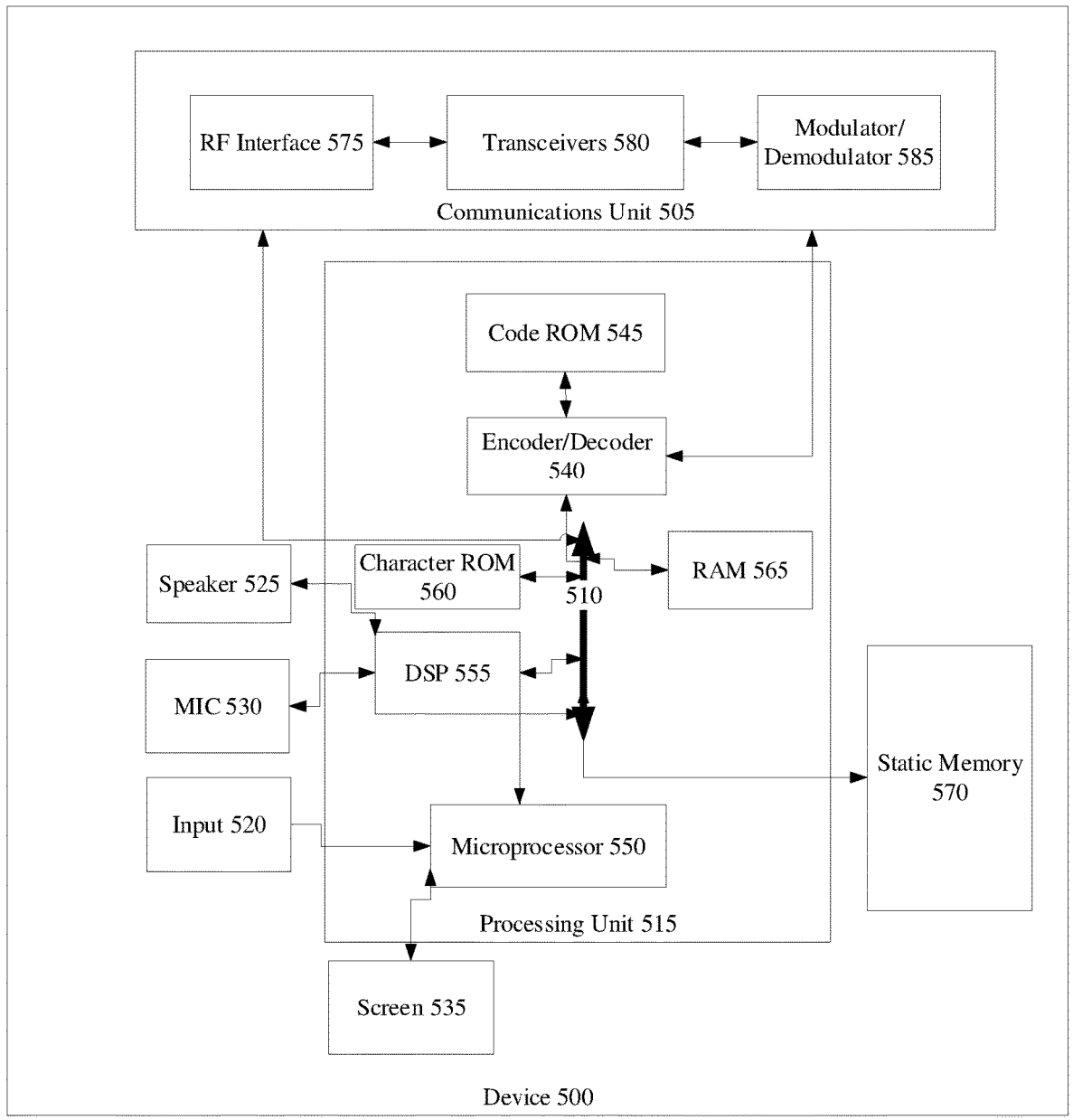
FIG. 5 is a block diagram of a user device used in accordance with some embodiments.

FIG. 5 is a diagram of a user device 500, such as user device of FIG. 1. User device 500 may include a communications unit 505 coupled to a common data and address bus 510 of a processor 515. Device 500 may also include an input unit (e.g., keypad, pointing device, etc.) 520, an output transducer unit (e.g., speaker) 525, an input transducer unit (e.g., a microphone) (MIC) 530, and a display screen 535, each coupled to be in communication with the processor 535.

The processor 515 may include, that is, implement, an encoder/decoder 540 with an associated code read-only memory (ROM) 545 for storing data for encoding and decoding voice, data, control, or other signals that may be transmitted or received by device 500. The processor 515 may further include one or more of a microprocessor 550 and digital signal processor (DSP) 555 coupled, by the common data and address bus 510, to the encoder/decoder 540 and to one or more memory devices, such as a ROM 560, a random-access memory (RAM) 565, and a static or flash memory 570. One or more of ROM 560, RAM 565, and flash memory 570 may be included as part of processor 515 or may be separate from, and coupled to, the processor 515. The encoder/decoder 540 may be implemented by microprocessor 550 or DSP 555 or may be implemented by a separate component of the processor 515 and coupled to other components of the processor 515 via bus 510.

Communications unit 505 may include an RF interface 575 configurable to communicate with network components, and other user equipment within its communication range. Communications unit 505 may include one or more broadband and/or narrowband transceivers 580, such as a Long-Term Evolution (LTE) or 5G transceiver, a WiMAX transceiver, one or more local area network or personal area network, or a Bluetooth transceiver. The transceivers may be coupled to a combined modulator/demodulator 585 that is coupled to the encoder/decoder 540.

The one or more memory devices 560, 570 may store code for decoding or encoding data such as control, request, or instruction messages, channel change messages, and/or data or voice messages that may be transmitted or received by device 500 and other programs and instructions that, when executed by the processor 515, provide for device 500 to perform the functions and operations described herein.

Figure 6:
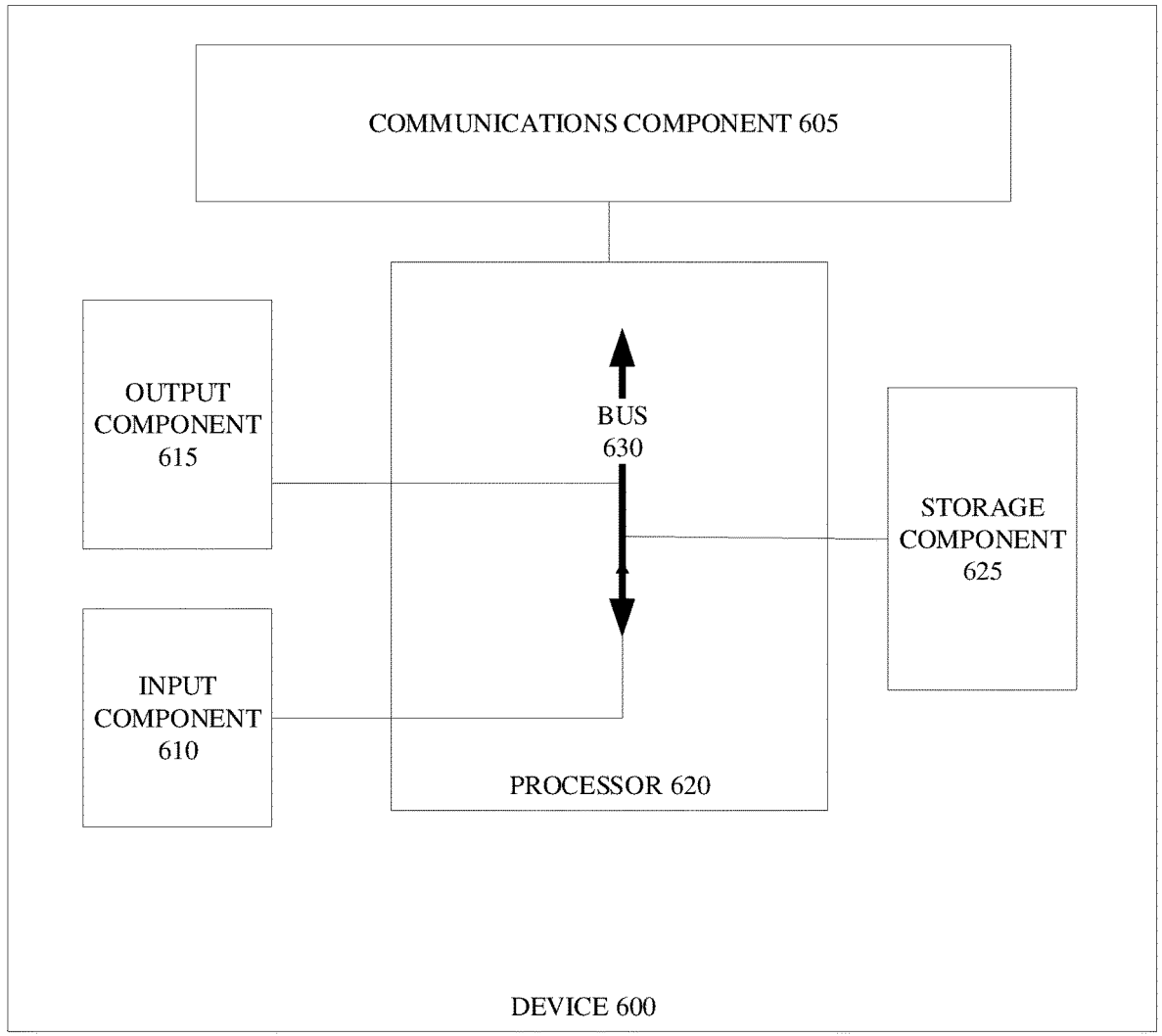
FIG. 6 is a block diagram of a system used in accordance with some embodiments.

FIG. 6 is a diagram of example components of one or more devices of FIG. 1. Device 600 may correspond to communal media system 100 and/or one or more of systems 102, In some implementations, communal media system 100 and/or one or more of systems 102 may include one or more devices 600 and/or one or more components of device 600.

Device 600 may include, for example, a communications component 605, an input component 610, an output component 615, a processor 620, a storage component 625, and a bus 630.

Bus 630 may include components that enable communications among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, a microphone and/or a display screen), and/or components that permit device 600 to determine location or other sensor information (e.g., an accelerometer, a gyroscope, an actuator, another type of positional or environmental sensor). Output component 615 may include components that provide output information from device 600 (e.g., a speaker, display screen, and/or the like). Input component 610 and output component 615 may also be coupled to be in communication with the processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as a random-access memory (RAM), a read-only memory (ROM), and/or another type of dynamic or static storage device (e.g., a flash memory, a magnetic memory, and/or an optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 605 may include a transceiver-Like component that enables device 600 to communicate with other devices, such as via a wired connection, a wireless connection, or a combination of wired and wireless connections. Communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar type of wireless transceiver configurable to communicate via a wireless network for infrastructure communications. Communications component 605 may also include one or more local area network or personal area network transceivers, such as Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 6 may perform one or more functions described as being performed by another set of components of device 6.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, and unrelated items, and/or the like), and may be used interchangeably with "one or more." Where only one item is intended, the term "only one" or similar language is used. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

I claim:

1. A communal media system, comprising:
   a content management system comprising a memory to store a multimedia content;
   a synchronization system comprising a processor to:
      retrieve the multimedia content for delivery to a plurality of user devices, receive a video recorded on one of the plurality of user devices, and receive a social media content generated by the plurality of user devices;
      separate the multimedia content, the video, and the social media content into a set of prioritized layers and transmit the multimedia content, the video, and the social media content to the plurality of user devices;
      continuously receive at least one of timestamp receipts and fragment identifier acknowledgements associated with receipt of the multimedia content, the video, and the social media content from the plurality of user devices; and
      adjust simultaneous deliveries of the multimedia content, the video, and the social media content to the plurality of user devices, based on at least one of the timestamp receipts and the fragment identifier acknowledgements received from each of the plurality of user devices, wherein the multimedia content and the social media content are delivered to each of the plurality of user devices at a same time; and
   a recording system comprising a processor to record a communal session including the multimedia content, the video, and the social media content.

2. The communal media system of claim 1, wherein the recording system records video from at least one of a forward camera and a reverse camera on one of the plurality of user devices.

3. The communal media system of claim 1, wherein the recording system triggers a camera function on one of the plurality of user devices when the recording system is activated.

4. The communal media system of claim 1, wherein the recording system captures at least one of video, video chat, audio, and the social media content being transmitted in the communal session.

5. The communal media system of claim 1, wherein the recording system triggers a camera function on a first one of the plurality of user devices when the recording system is activated on a second one of the plurality of user devices.

6. The communal media system of claim 1, wherein the recording system records fragments associated with at least one of video, video chat, audio, and the social media content as the fragments are received or sent by one of the plurality of user devices which activated recording of the communal session.

7. The communal media system of claim 6, wherein the recording system recreates a recorded video associated with the communal session by combining the fragments using at least one of the timestamp receipts and the fragment identifier acknowledgments for the fragments recorded on one of the pluralities of user devices where the recording system is activated.

8. The communal media system of claim 1, wherein the recording system stores a recreated video associated with the communal session on one of the plurality of user devices which activated recording of the communal session.

9. The communal media system of claim 1, wherein the recording system transcodes a recreated video associated with the communal session into at least one of multiple bit rates and resolutions for distribution to various types of devices using varying network connection speeds.

10. The communal media system of claim 1, wherein the recording system creates a manifest file and meta data for a recreated video associated with the communal session and stores the manifest file and the meta data in the content management system, wherein the recreated video can be shared in another communal session or viewed outside of the communal session.

11. A method for delivering a multimedia content during a communal media session, comprising:
   at a communal media system, registering a plurality of user devices to participate in the communal media session;
   during the communal media session,
      retrieving, by a synchronization system, the multimedia content for delivery to the plurality of user devices, receiving a video recorded on one of the plurality of user devices, and receiving a social media content generated by the plurality of user devices;
      separating, by the synchronization system, the multimedia content, the video, and the social media content into a set of prioritized layers and transmitting the multimedia content, the video, and the social media content to the plurality of user devices;
      continuously receiving, by the synchronization system, at least one of timestamp receipts and fragment identifier acknowledgements associated with receipt of the multimedia content, the video, and the social media content from the plurality of user devices; and
      adjusting, by the synchronization system, simultaneous deliveries of the multimedia content, the video, and the social media content to the plurality of user devices, based on at least one of the timestamp receipts and the fragment identifier acknowledgements received from each of the plurality of user devices, wherein the multimedia content and the social media content are delivered to each of the plurality of user devices at a same time; and
      recording, by a recording system, a video of a communal session including the multimedia content, the video, and the social media content.

12. The method of claim 11, further comprising capturing video from at least one of a forward camera and a reverse camera on one of the plurality of user devices.

13. The method of claim 11, further comprising triggering a camera function on one of the plurality of user devices when the recording system is activated.

14. The method of claim 11, further comprising capturing at least one of video, video chat, audio, and the social media content being transmitted in the communal session when recording the communal session.

15. The method of claim 11, further comprising triggering a camera function on a first one of the plurality of user devices when the recording system is activated on a second one of the plurality of user devices.

16. The method of claim 11, further comprising recording fragments associated with at least one of video, video chat, audio, and the social media content as the fragments are received or sent by one of the plurality of user devices which activated recording of the communal session.

17. The method of claim 16, further comprising recreating a recorded video associated with the communal session by combining the fragments using at least one of the timestamp receipts and the fragment identifier acknowledgments for fragments recorded on one of the pluralities of user devices where the recording system is activated.

18. The method of claim 11, further comprising transcoding a recreated video associated with the communal session into at least one of multiple bit rates and resolutions for distribution to various types of devices using varying network connection speeds,
   creating a manifest file and meta data for the recreated video, and
   storing the manifest file and the meta data in a content management system so that the recreated video can be shared in another communal session or viewed outside of the communal session.

19. A non-transitory computer-readable medium to store one or more instructions, when executed by one or more processors of a device, may cause the one or more processors to:
   retrieve a multimedia content for delivery to a plurality of user devices, receive a video recorded on one of the plurality of user devices, and receive a social media content generated by the plurality of user devices;
   separate the multimedia content, the video, and the social media content into a set of prioritized layers and transmit the multimedia content, the video, and the social media content to the plurality of user devices;
   continuously receive at least one of timestamp receipts and fragment identifier acknowledgements associated with receipt of the multimedia content, the video, and the social media content from the plurality of user devices;
   adjust simultaneous deliveries of the multimedia content, the video, and the social media content to the plurality of user devices, based on at least one of the timestamp receipts and the fragment identifier acknowledgements received from each of the plurality of user devices, wherein the multimedia content and the social media content are delivered to each of the plurality of user devices at a same time; and
   record a communal session including the multimedia content, the video, and the social media content.

* * * * *